2,978,515
PROCESS FOR PREPARING PHENOL DERIVATIVES

Lewis H. Conklin, Cuyahoga Falls, and Roland A. McPherson, Jr., Akron, Ohio, assignors to The B. F. Goodrich Company, New York, N.Y., a corporation of New York No Drawing. Filed May 24, 1956, Ser. No. 586,935

5 Claims. (Cl. 260—619)

This invention relates to an improved method for making derivatives of phenols and relates more specifically to an improvement in the method for making alkylated and aralkylated phenolic compounds.

Alkylated and aralkylated phenolic compounds are well known. Such compounds are ordinarily prepared by the condensation of phenols with aryl substituted alkene hydrocarbons such as styrene, and tertiary olefins such as isobutylene, or a mixture of such materials. The condensation reaction of the phenol with the aryl substituted alkene hydrocarbons and tertiary olefins ordinarily takes place under the influence of acidic condensation catalysts. The reactions are often conducted in the absence of a diluent, but ordinarily, particularly with high melting point phenols, non-reactive hydrocarbon diluents such as benzene and toluene are used. The use of such diluents or solvents in these reactions is not completely satisfactory. For example, such diluents as benzene and toluene are difficult to remove from the purified reaction product and as a result the reaction products may be toxic, the flash point of the product is low and the heat loss is quite high.

We have now discovered that when triisobutylene is used as the reaction diluent for the condensation reaction of phenols with tertiary olefins and/or aryl substituted alkene hydrocarbons, a relatively non-toxic reaction product with greatly increased flash point and with improved heat loss is obtained. Condensation reactions carried out by the improved process of this invention progress rapidly and smoothly to essentially 100% completion.

The improved process of this invention may be applied to the alkylation and aralkylation of any of the phenols including phenol itself, para-octyl phenol, hydroquinone, resorcinol, catechol, pyrogallol, phenylphenol, naphthol, 1,5-dihydroxy naphthylene, 2,2-bis-(4-hydroxyphenyl) propane, hydroxy biphenyl and the like. All of these phenols possess the structure Ar(OH)n, wherein Ar is an aromatic hydrocarbon radical to which the hydroxyl groups are directly attached and n is a number from 1 to 3. The improved process of this invention is particularly valuable when applied to reactions involving bis-phenols having the formula HO—Ar—A—Ar—OH, wherein Ar is an aromatic hydrocarbon radical having its connecting valences on nuclear carbon atoms and A is an alkylidine radical. Examples of such alkylidine bis-phenols include bis-(4-hydroxyphenyl) methane; 2,2-bis-(4-hydroxyphenyl) propane; 2,2-bis-(4-hydroxyphenyl) butane; 2,2-bis-(4-hydroxyphenyl)-4-methyl pentane; 1,1-bis-(4-hydroxyphenyl) ethane; bis-(4-hydroxy-2,6-dimethylphenyl) methane; 1,1-bis-(2,5-dimethyl-4-hydroxyphenyl) propane; 2,2-bis-(3-methyl-4-hydroxyphenyl) propane; 2,2-bis-(3-isopropyl-4-hydroxyphenyl) propane; 2,2-bis-(3-phenyl-4-hydroxyphenyl) propane; 2,2-bis-(4-hydroxyphenyl) heptane; 3,3-bis-(4-hydroxyphenyl) pentane; bis-(4-hydroxy-1-naphthyl) methane, 1,2-bis-(4-hydroxyphenyl) ethane; 1,2-bis-(2-hydroxyphenyl) ethane; 1,5-bis-(4-hydroxyphenyl) pentane; 1,3-bis-(4-hydroxyphenyl)-2,2-diethyl propane and the like and their homologs. Most of these bis-phenolic compounds are readily prepared by the condensation of two moles of a monohydric phenol with a ketone or aldehyde, as it is well known to those skilled in the art.

Any of the aryl substituted alkene hydrocarbons may be employed in this invention. Examples of such hydrocarbons include styrene, alpha-methyl styrene, p-methyl styrene, alpha-methyl-p-methyl-styrene, beta-methyl styrene, ethyl styrene, 2-methylallyl benzene, 2-methyl-1,1-di-phenyl propene, allyl benzene, isopropenyl naphthalene, allyl naphthalene, propenyl benzene, 6-phenyl hexene and 1-phenyl pentene, and the like. The preferred hydrocarbon reactants are styrene and homologs of styrene of the formula

wherein Ar is aryl and R is hydrogen or an alkyl radical containing 1 to 5 carbon atoms.

The tertiary olefin employed in the improved process of the invention may contain from 4 to 8 carbon atoms of which the following are examples: isobutylene, isoamylene, 2-methyl pentene-1, 2-ethyl propene-1, 2-ethyl pentene-1, 2-methyl hexene-1, diisobutylene and the like as well as a mixture of such olefins.

Any of the known acidic condensation catalysts may be used in the improved process of this invention. Such acidic condensation catalysts include boron trifluoride, sulfuric acid, phosphoric acid, hydrocarbon sulfonic acids, hydrogen halides, activated clays and the like.

The amount of triisobutylene may be varied over a wide range as will be recognized by those skilled in the art. Ordinarily an amount to give the reaction mass good fluidity under the reaction conditions is sufficient. For usual reactions of the types hereinabove specified, in stirred autoclaves, about 50 weight parts to 200 weight parts of triisobutylene per 100 weight parts of reactants are employed, more preferably an amount from about 75 to 150 weight parts of triisobutylene are used.

The reaction products most readily prepared by the improved process of this invention are the condensation reaction products of 2,2-bis-(4-hydroxyphenyl) propane with isobutylene or diisobutylene and/or styrene and styrene hydrocarbons including, for example, alpha-methyl styrene, vinyl toluene, ethyl styrene and the like. These condensation reaction products are exceedingly valuable non-staining antioxidants which have wide use as preservatives, age resistors and antioxidants for organic materials including particularly, petroleum products and rubber, both natural and synthetic. When such condensation reaction products are prepared with triisobutylene as the reaction diluent, the reaction is rapid, smooth and trouble-free, the yield is essentially quantitative, the triisobutylene may be readily removed from the reaction product by vacuum stripping and reused and the resulting product has a low volatile content, a high flash point and is relatively non-toxic. When benzene is employed as the reaction diluent it is impractical if not impossible to remove all of the benzene from the product on a production commercial basis and the benzene remaining in the product causes some components of the reaction product to precipitate or crystallize which is quite undesirable. In addition, reaction products so prepared have high volatility, high heat loss, low flash point and a high degree of toxicity. Of other diluents that have been proposed, diisobutylene and isopropanol are quite unsatisfactory as reaction diluents. Diisobutylene polymerizes and isopropanol poisons the reaction.

The condensation reaction may be carried out in an autoclave equipped with a stirrer, heater, a reflux condenser and inlet tubes for introducing gaseous tertiary olefins at the bottom of the reactor. The reaction is preferably conducted under an inert atmosphere such as nitrogen. The triisobutylene is placed in the reactor and the phenol and acidic catalyst added thereto. The mixture is stirred vigorously while heating to a temperature of about 70° C. under a nitrogen atmosphere. The tertiary olefin is preferably added to maintain an optimum reaction rate, and if added too slowly, dimer and trimer may be formed. If an acid activated clay is employed as the catalyst, the reaction mixture is filtered at the end of the reaction and the solvent removed therefrom. If sulfuric acid is employed as a catalyst, it must be neutralized with an alkali such as sodium carbonate at the end of the reaction, the product washed with water and the two layers which form then separated. The triisobutylene is then stripped from the reaction mixture under reduced pressure. The remaining reaction product may be used as is, or further purified by fractional distillation to separate the various substituted phenol derivatives. Triisobutylene is quite effective when used as the diluent in continuous operations.

A preferred embodiment of the invention may be demonstrated by conducting a condensation reaction of the type hereinabove described in a heated autoclave equipped with a stirrer and adapted to operate under vacuum. 220 weight parts of triisobutylene, 215 weight parts of 2,2-bis-(4-hydroxyphenyl) propane and 35 weight parts of a finely divided acid activated clay are charged to the autoclave and the reactants are dried by heating under vacuum at a temperature of about 75° C. 39 weight parts of styrene are then added to the autoclave and 179 parts of isobutylene are added to the reaction mixture at a rate of about 15 to 24 weight parts per hour. The reaction takes place rapidly and is essentially complete when all of the isobutylene is added to the autoclave. The temperature of the mixture is kept between about 70° C. and 80° C. during the course of the reaction. The reaction mixture is then filtered and the excess triisobutylene removed from the condensation reaction product by vacuum stripping. The resulting alkylated-aralkylated bis-phenol, obtained in amount about 100% of the theoretical yield, has a flash point of about 230° F. or higher, is relatively non-toxic, has a low volatile content and such product on storage is free of precipitation or crystallization in the product. The triisobutylene recovered from the reaction product can be recycled and employed again. When the above experiment is repeated with benzene as the diluent instead or triisobutylene the resulting reaction product after stripping has a flash point of about 100° F., high heat loss and volatility, and the reaction product on storage crystallizes, often in only a few days.

When additional isobutylene is used to replace the styrene, additional styrene is employed to replace the isobutylene, when diisobutylene is substituted for isobutylene, when alpha-methyl styrene, vinyl toluene or ethyl styrene are used as a substitute for all or part of the styrene and when any of the bis-phenols of the type defined are employed in similar reactions with triisobutylene as the reaction diluent, similar results and improved reaction products are obtained. All of the above disclosed materials result in reaction products, when made by the defined process, of value as age resistors in a variety of applications to protect organic materials.

It is apparent that various embodiments and modifications of the invention in addition to those specifically disclosed and illustrated may be employed without departing from the spirit and scope of the invention as defined in the appended claims.

We claim:

1. In the process for preparing condensation reaction products of phenols with a material selected from the class consisting of aryl substituted alkene hydrocarbons and tertiary olefins containing 4 to 8 carbon atoms, the improvement which comprises conducting said condensation reaction in the presence of triisobutylene diluent at a temperature of about 70° C. to about 80° C.

2. In the process for preparing condensation reaction products of phenols with aryl substituted alkene hydrocarbons and tertiary olefins containing 4 to 8 carbon atoms, the improvement which comprises conducting said condensation reaction in the presence of triisobutylene diluent at a temperature of about 70° C. to about 80° C.

3. In the process for preparing condensation reaction products of bis-phenols of the formula HO—Ar—A—Ar—OH wherein Ar is an aromatic hydrocarbon radical having its connecting valences on nuclear carbon atoms and A is an alkylidine radical, with an aryl substituted alkene hydrocarbon and a tertiary olefin containing from 4 to 8 carbon atoms, the improvement which comprises conducting said condensation reaction in the presence of triisobutylene diluent at a temperature of about 70° C. to about 80° C.

4. In the process for preparing condensation reaction products of 2,2-bis-(4-hydroxyphenyl) propane with a tertiary olefin selected from the group consisting of isobutylene and diisobutylene and a styrene hydrocarbon, the improvement which comprises conducting said condensation reaction in the presence of about 50 to 200 weight parts of triisobutylene diluent per 100 weight parts of said 2,2-bis-(4-hydroxyphenyl) propane, tertiary olefin and styrene hydrocarbon at a temperature of about 70° C. to about 80° C.

5. In the process for preparing condensation reaction products of 2,2-bis-(4-hydroxyphenyl) propane with isobutylene and styrene, the improvement which comprises conducting said condensation reaction in the presence of about 75 to 150 weight parts of triisobutylene diluent per 100 weight parts of said 2,2-bis-(4-hydroxyphenyl) propane, isobutylene and styrene at a temperature of about 70° C. to about 80° C.

References Cited in the file of this patent

UNITED STATES PATENTS

| | | |
|---|---|---|
| 2,060,573 | Hester | Nov. 10, 1936 |
| 2,247,402 | Perkins et al. | July 1, 1941 |
| 2,321,440 | Ward | June 8, 1943 |
| 2,332,555 | Buc | Oct. 26, 1943 |
| 2,636,905 | Kehe et al. | Apr. 28, 1953 |
| 2,714,120 | Kehe | July 26, 1955 |
| 2,745,726 | Young et al. | May 15, 1956 |